(12) United States Patent
Van Schellebeek

(10) Patent No.: US 8,132,390 B2
(45) Date of Patent: Mar. 13, 2012

(54) COVERING MATERIAL FOR ROOFS

(75) Inventor: Dirk Johannes Van Schellebeek, Ede (NL)

(73) Assignee: Ubbink B.V., AA Doesburg (NL)

( * ) Notice: Subject to any disclaimer, the term of this patent is extended or adjusted under 35 U.S.C. 154(b) by 652 days.

(21) Appl. No.: 11/989,895

(22) PCT Filed: Aug. 1, 2006

(86) PCT No.: PCT/NL2006/000395
§ 371 (c)(1),
(2), (4) Date: Mar. 19, 2009

(87) PCT Pub. No.: WO2007/015637
PCT Pub. Date: Feb. 8, 2007

(65) Prior Publication Data
US 2009/0217609 A1    Sep. 3, 2009

(30) Foreign Application Priority Data
Aug. 3, 2005   (NL) .................................... 1029674

(51) Int. Cl.
*E04B 1/00*  (2006.01)
*E04G 21/00* (2006.01)
*E04G 23/00* (2006.01)
*E04G 21/14* (2006.01)
*E04C 1/00*  (2006.01)

(52) U.S. Cl. ................. 52/746.11; 52/746.1; 52/749.12; 52/309.1; 52/408

(58) Field of Classification Search ................. 52/309.1, 52/309.13, 408, 746.1, 746.11, 749.12; 427/355
See application file for complete search history.

(56) References Cited

FOREIGN PATENT DOCUMENTS

| EP | 0 816 426 | 1/1998 |
| GB | 2 184 685 | 7/1987 |
| NL | 1023629 | 12/2004 |
| WO | 2004/083555 | 9/2004 |

*Primary Examiner* — Mark Wendell
(74) *Attorney, Agent, or Firm* — Ladas & Parry LLP

(57) ABSTRACT

Method for manufacturing a composite flat covering material, comprising supplying a web of stretch aluminum mesh which after stretching has been tempered, passing the web of stretch aluminum mesh in immersed condition through a bath of first bituminous material, passing the stretch aluminum mesh out of the bath, skimming first bituminous material along at least an upper side of the web of stretch aluminum mesh and applying a layer of second bituminous material onto the skimmed side.

33 Claims, 3 Drawing Sheets

COVERING MATERIAL FOR ROOFS

FIELD OF THE INVENTION

The invention relates to a covering material for roofs, particularly for transitions between various construction parts in roofs.

Such transitions between various construction parts are for instance present in the connection of skylights, dormer windows or chimneys (lead flashings) with the actual roof covering, such as a tile roof. For such transitions it is among others of importance that the covering material is stretchable.

BACKGROUND OF THE INVENTION

A covering material as described above, comprising a metal layer that is mesh-shaped and provided with apertures, and furthermore a layer of bituminous material applied at least one side of the mesh and extending through the apertures, wherein the bituminous material comprises a bitumen and a polymer that is a thermoplastic elastomer, is known from applicant's, international PCT application WO 2004/083555 A1. According to this PCT application the thermoplastic elastomer (TPE) with which the bitumen could have been modified, can particularly be SBS (styrene butadiene styrene) polymer or—in connection with its UV-resistance—SEBS (styrene ethylene/butadiene styrene) polymer. Furthermore the content of SBS or SEBS preferably is approximately 10-30% by weight, particularly approximately 20% by weight, related to the overall weight of the bitumen. According to the said PCT application the advantage of modification of bitumen with a thermoplastic elastomer is that the thus modified bitumen is highly stretchable and has a large penetration resistance.

There is a need for a simple and manageable process for a roofing material, that is durable, easy to apply, in particular can be plastically arranged in a profile shape, and may serve as a lead-substitute.

There is a need for a simple and manageable process for manufacturing such a roofing material, with which desired properties, composition and/or thickness can be adapted to.

There is a need for such a roofing material, which retains its integrity and sealing effect also in case of deformation and after a long service life.

SUMMARY OF THE INVENTION

From one aspect the invention provides a method for manufacturing a composite flat covering material, comprising supplying a web of stretch aluminium mesh which after stretching has been tempered, passing the web of stretch aluminium mesh in immersed condition through a bath of first bituminous material, passing the stretch aluminium mesh out of the bath, skimming first bituminous material along at least an upper side of the web of stretch aluminium mesh and applying a layer of second bituminous material onto the skimmed side.

The bath ensures that all the mesh material is covered with bituminous material. The mesh material is enveloped by the hot bituminous material on all sides. The second bituminous material is applied on a skimmed surface, so that the thickness of the final product is controlled. The heat of the second bituminous material has little effect on the mesh material, as said material has as it were already been wrapped by the first bituminous material. During the further manufacturing process the deformation out of the plane of the web of mesh material will as a result remain limited. The second layer is then able to form a more level surface. This also enhances the optional application of a foil layer on the second layer. The distance of said foil to the mesh material will be relatively constant. A desired thickness can easily be adapted to by means of the second layer. The roofing material can be produced in a simple and controlled manner.

The first bituminous material as regards composition may be similar to the second bituminous material. Both materials per se then have almost the same physical, particularly mechanical properties, such as for instance stretchability, as a result of which the integrity is enhanced. Moreover the adhesion between both layers of bituminous material can be enhanced in that way.

In one embodiment the web of stretch aluminium mesh in the bath is guided around at least one, preferably driven turning roller and is diverted there from a downward direction of running to an upward direction of running. In this way the flatness of the web of mesh material is enhanced, as a result of which the final product will be more uniform. This is particularly advantageous when the web of stretch aluminium mesh is supplied on a roll and is unwound for supply to the bath.

The flatness is further enhanced when the web of stretch aluminium mesh is guided around several turning rollers placed in the bath and turning rollers placed in between those according to a zig-zag path, wherein preferably several of the turning rollers are driven.

In one embodiment the turning rollers that have been placed in between have been placed over the bath. As a result the immersion is carried out several times, as a result of which the adhesion of bituminous material is enhanced.

The web of stretch aluminium mesh when finally coming out of the bath can be guided over a turning roller, between the turning roller in question and a first, optionally heated, scraper placed above it. The first scraper skims the web.

In the bath the first bituminous material may have a temperature of 140-180° C., preferably 160-170° C. When arriving at the place of application for the second bituminous material, the first bituminous material may have a temperature of below 100° C.

In one embodiment the web of stretch aluminium mesh is immersed several times in the bath prior to the layer of second bituminous material being applied.

In one embodiment the web of stretch aluminium mesh after finally coming out of the bath is scraped at the lower side that is opposite the upper side, by means of an optionally heated, second scraper, as a result of which optionally sagged bituminous material is scraped off. In this way the thickness is further controlled.

In one embodiment after coming out of the bath and prior to applying the layer of second bituminous material, a foil layer is provided at the lower side that is opposite the upper side. Said foil layer prevents adhesion to a next support surface and/or, after the web of ready roofing material has been wound up, adhesion to each other of successive layers in the roll. The foil layer furthermore forms a retaining means for sagging bituminous material.

The web at the lower side that is opposite the upper side (optionally after applying the foil layer) can be passed over to a belt conveyor for supporting the web when applying the layer of second bituminous material. Despite the fact that the web sits more or less free on the belt the deformation out of the plane of the web remains limited, for the aforementioned reason. The surface of the belt conveyor can be cooled for enhancing the solidification of the first and second bituminous material.

After application of the second bituminous material the upper side can be skimmed.

In the roofing material according to the invention the metal layer forms a plastic yet reinforcing component and the (first) bituminous material the sealing component, which has a large penetration resistance and as a result is durable, able to tightly adhere to the metal mesh and as a result able to form a durable structure with the metal mesh, as well as able to provide a demonstrated proper sealing, of importance for obtaining a water-retaining roofing material. The bituminous material moreover is a cheap material, that is easily liquidised and subsequently in the described continuous immersion process can be joined on the mesh.

In a further embodiment, downstream of applying the layer of second bituminous material, a layer of third bituminous material is applied thereon. The second bituminous material may differ from the third bituminous material or be similar thereto. After application of the third bituminous material the upper side may be skimmed.

If the (second—in that case differing from the first bituminous material—or third) bituminous material applied the last at the upper side contains a colourant, application of a coloured foil at the upper side can be dispensed with. In this way roofing material can be provided in a desired colour (other than black) without an additional step in the process path.

The roofing material obtained using the process according to the invention may comprise:
- a covering bottom layer comprising a metal layer that is mesh-shaped and provided with apertures, and a layer of primary bituminous material which has been applied on least one side of the mesh, preferably all sides, and extends through the apertures, wherein the bituminous material comprises bitumen and a polymer, and
- a coloured secondary bituminous material which has been applied on the covering bottom layer at its upper side, and comprises a coloured material comprising "clear" bitumen", a colourant and a polymer,
- wherein the "clear" bitumen of the coloured material in the colour top layer is a bitumen from which nearly all asphaltenes have been removed or a material comparable therewith.

The primary bituminous material may be formed by said first bituminous material or said first and second bituminous material. The secondary bituminous material may in the first case be the second bituminous material, in the second case the said third bituminous material.

According to the invention the bituminous material as used for the colour top layer, may be bitumen from which nearly all asphaltenes have been removed. The asphaltenes namely provide regular bitumen with their characteristic black colour. Such almost asphaltene-free bitumen is usually referred to in the art as "clear" bitumen. An example of a product comparable to "clear" bitumen, is the product that is made commercially available under the name of "MEXPHALTE" (by Shell Bitumes).

The polymer of the coloured material in the colour top layer may be the same as the polymer of the bituminous material in the covering bottom layer.

In the primary and secondary layers the bituminous material may have been modified with the same polymer. For that purpose a thermoplastic elastomer (TPE) can be used, particularly SBS or—in connection with its UV-resistance—SEBS. Alternatively Atactic polypropene (APP) can be used. Amorph poly-alpha olefin (APAO) can also be used, which has a large temperature window and renders the bituminous material more properly processable for application on the mesh. APAO-modified bituminous material turned out to become less brittle at lower temperatures, which is of importance for sealings on a roof.

In the primary and/or secondary layer the content of polymer preferably is approximately 10-30% by weight, more particularly approximately 15-25% by weight, based on the overall weight of the layer in question. Such modified bitumen material has a shape memory, is highly stretchable (large men stretch at rupture; in the order of 30% to hundreds of %) and has a large penetration resistance. Preferably the content of polymer in the primary and secondary layers is almost equal.

In case SBS and SEBS polymers, so-called triblock polymers, are used, in the present invention the proportion of styrene preferably is 20 to 40%, particularly approximately 30%, and the proportion of butadiene therein preferably is 80 to 60%, particularly approximately 70%.

The colourant of the coloured material in the colour top layer may be a pigment and selected from the group consisting of red and yellow iron oxides, titan oxides (white), chrome green and cobalt blue.

From another aspect the invention provides a method for manufacturing a composite roofing material for roofs according to the invention, wherein the method comprises the following steps:
- arranging a liquidised primary bituminous material, comprising bitumen and a polymer, on a metal mesh, such that the liquid bituminous material fills the apertures of the metal mesh, wherein the metal mesh and the arranged bituminous material together form a bottom layer of the composite roofing material; and
- arranging a liquidised coloured material comprising "clear" bitumen, a colourant and a polymer, on the bottom layer, wherein the arranged coloured material forms the colour top layer of the composite roofing material; and
- wherein the "clear" bitumen of the coloured material in the colour top layer is a bitumen from which nearly all asphaltenes have been removed or a material comparable therewith.

As described the metal mesh may be unwound and then be passed through a bath of bituminous material. Subsequently the lower side and/or upper side may be scraped off (skimmed) at a certain thickness with respect to the mesh. After that the product can be provided with a thin PE backing foil to counteract sticking in the subsequent steps. Subsequently the preferably still hot product is directly placed on a steel cooling belt (having a length of for instance approximately 60 meter). Via a preferably funnel-shaped discharge opening either an additional layer of the same bituminous material or said coloured material for the colour top layer can then be applied in liquid condition on the upper side of the product on the bottom layer, optionally followed by scraping off (skimming). If an additional layer of the same material has been applied, finally the application, optionally via a second discharge opening placed directly behind said (first) discharge opening, of a layer of the coloured material follows, optionally followed by scraping off (skimming).

By applying the bitumen-containing material in liquid condition and subsequently allowing them to solidify, a tight bond is obtained between the metal and the bitumen-containing material, and between the bituminous material of the covering bottom layer and the coloured material of the colour top layer, respectively. In the latter case it will be of importance that when applying the coloured material the previously applied bituminous material has not yet solidified. This can be achieved by already applying the liquid coloured material when the bituminous material of the covering bottom layer is still warm. When the bituminous material of the covering bottom layer has already solidified, said material can first be reheated, for instance at a temperature between 140 and 160° C., prior to the coloured material being applied. In that way an optimal adhesion between both layers can be ensured.

A foil of fire-resistant and/or UV-resistant properties may be applied on the solidifying still hot colour top layer. Said foil, however, need not provide a colour.

The aspects, processes, process steps and measures described and/or shown in the application may where possible also be used individually. Said individual aspects may be the subject of divisional patent applications relating thereto.

BRIEF DESCRIPTION OF THE DRAWINGS

The invention will be elucidated on the basis of an exemplary embodiment shown in the attached drawings, in which.

DETAILED DESCRIPTION

Figure 1:
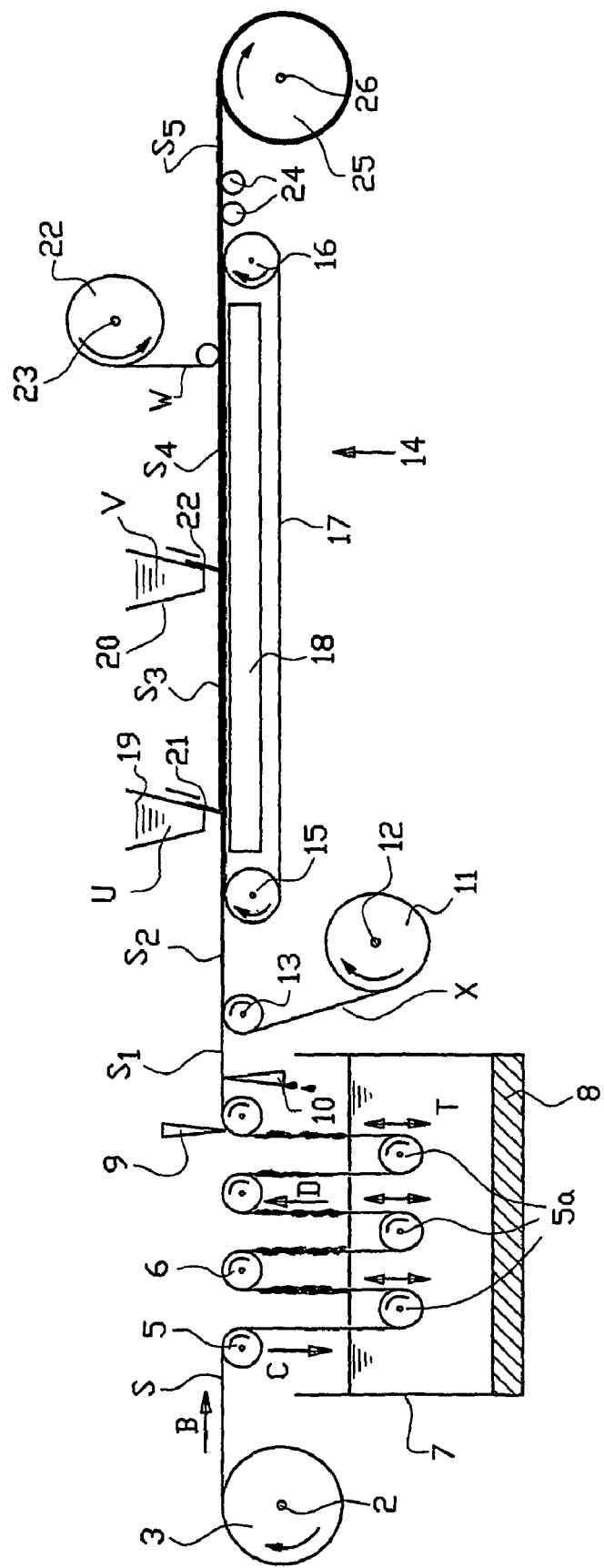
FIG. 1 shows a schematic view of an example of an arrangement for carrying out the method according to the invention.

The arrangement 1 shown in FIG. 1 comprises a roll of mesh material S, to be further discussed below, which roll 2 has been placed on a shaft 3. Downstream of the roll 2 a container 7 has been positioned, filled with a first bituminous material T. By means of heating elements 8 that are schematically shown, the bituminous material T is kept at a temperature of 140-180° C.

Over the container 7 a diverting roller 4 has been placed. In the container 7, surrounded by the bituminous material T, (in this example three) lower turning rollers 5a have been positioned. Over the container 7, particularly over the upper surface of the bituminous material T, (in this example two) upper turning rollers 5b have been positioned. As considered in the drawing on the right hand side of the extreme right lower turning roller 5a a diverting roller 6 has been arranged, near the edge of the container 7.

Above the roller 6 a first, heated scraper 9 has been arranged, of which the distance to the roller 6 can be adjusted. Immediately on the right hand side of the roller 6 a second heated scraper 10 has been positioned, of which the vertical position can also be adjusted. One or more of the rollers 4, 5a, 5b, 6 may be driven.

On the right hand side of the container 7 a conveyor 14 has been positioned, having a steel belt 17, that circulates around the rollers 15, 16, one of which is driven. In the space surrounded by the belt 17 a schematically shown cooling device 18 has been arranged, for cooling the upper course of the belt 17 and the products S2-5 sitting thereon.

Above the upper course of the belt 17 a container 19 for a second bituminous material U has been arranged, which has also been provided with means that are not further shown for heating said material at a temperature of 140-160° C. At the discharge opening situated at the bottom, a heated skimmer 20 has been provided, of which the distance to the belt 17 can be adjusted.

The first and second bituminous material may be APAO-modified bituminous material, having an APAO content of 20-25% by weight, particularly 24% by weight.

On the right hand side thereof optionally a container 20 has been positioned, for a third bituminous material V, wherein the container 20 has also been provided with means that are not further shown for heating the bituminous material at a temperature of 140-180° C. The lower discharge opening of the container 20 as well has been provided with a skimmer 21, of which the distance to the belt 17 can be adjusted. The third bituminous material is a so-called clear, polymermodified bituminous material (MEXPHALTE C), to which a pigment has been added for obtaining the desired colour, for instance gravel colour (orange-brown), more or less corresponding with the regular colour of tiles. The polymer content may be as described above.

On the right hand side thereof over the belt 17, a roll 22 of UV-resistant foil material W has been arranged on a shaft 23.

On the right hand side of the roller 16 a number of support rollers 24 have been positioned, and on the right hand side thereof a shaft 26 on which a roll 25 of final product S5, yet to be discussed, can be wound up.

Figure 2A:
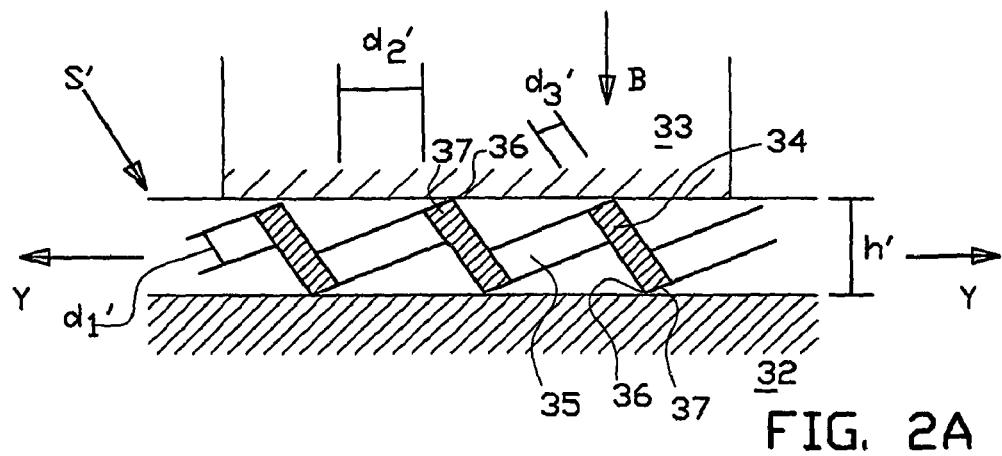
FIG. 2A shows a view in detail of a web of mesh material used in the arrangement of FIG. 1, however, prior to treatment.
Figure 2B:
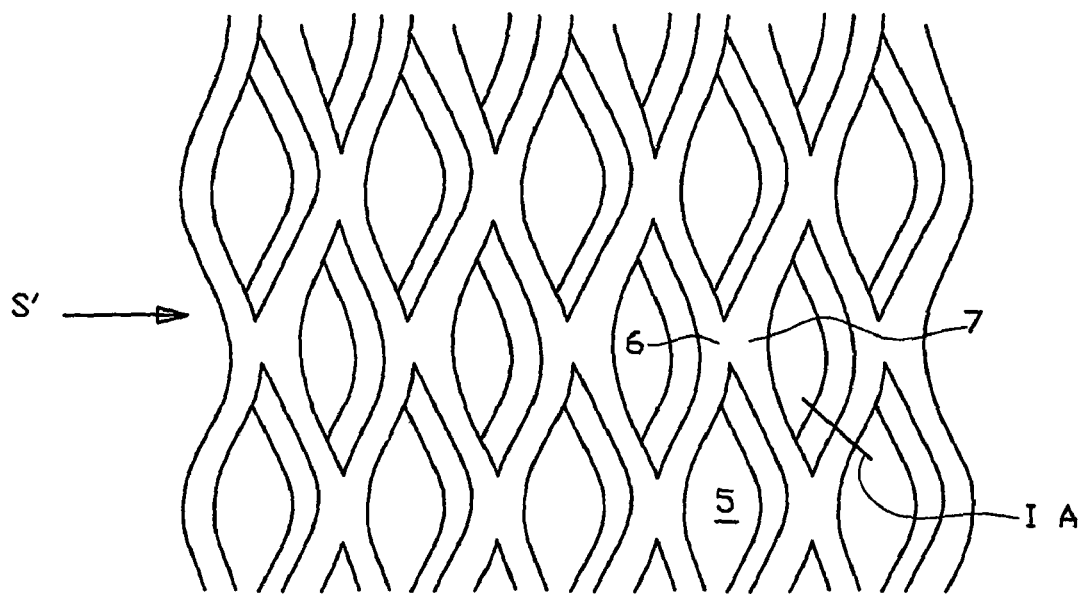
FIG. 2B shows a top view of the metal mesh of FIG. 2A.

The metal mesh S' shown in FIGS. 2A and 2B is known per se, and commercially available, and usually made of aluminium plate, in which transverse rows of short incisions have been made, the one row being staggered with respect to the next row. Subsequently the initial plate is pulled apart in opposite longitudinal directions Y, the aluminium areas 34 between the incisions tilt out of the main plane, and the incisions will by approximation form diamond-shaped apertures 35. Thus the metal mesh S' has been built up from strips of aluminium 34 formed as one unity with each other, which in between them define the apertures 35. In this example the dimensions shown d1', d2', d3' may be 1.5, 2.7 and 0.8 mm, respectively, and the height h' 2.3 mm, wherein the height h' is defined between the sharp tops 37 oriented to both sides, of the upper and bottom edges 36.

The aluminium mesh has been tempered in the manner known per se in a heat treatment (approximately 300° C. or higher) in order to provide the mesh with high plastic properties.

In FIG. 2A it is schematically shown that the metal mesh S is flattened between a fixed stamp 32 and a movable stamp 33 which is able to press in direction Z. Instead of said stamps 32 and 33 two rollers can be used for the same purpose. Alternatively flattening only one side may be opted for. Because of the little planes that are parallel to the main planes it is prevented without harming the adhesion between metal mesh and bituminous material too much, that the metal mesh cuts into the bituminous material too much and moreover a lower structure height of the covering material can be realised, while maintaining properties.

Figure 3:
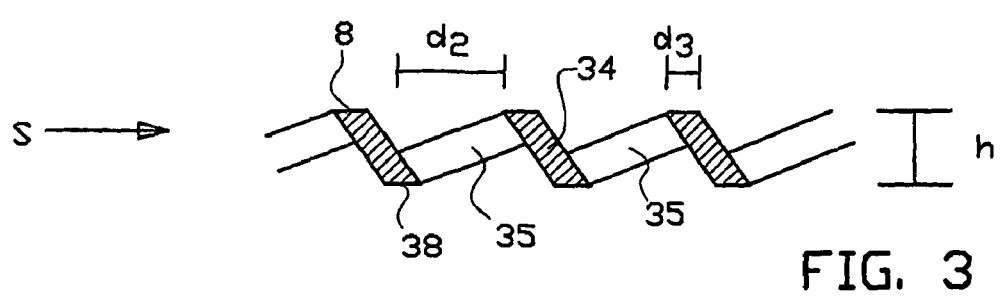
FIG. 3 shows the metal mesh according to FIGS. 2A and 2B after treatment.

The result thereof is shown in FIG. 3, with metal mesh S, of which the pointed areas 37 situated on both sides have been flattened into flat areas 38 that are oriented parallel to the extension of the metal mesh S. In this case the apertures 35 have been slightly reduced (d2 may for instance have become 2.5 mm), but the height h has become considerably smaller, in this example for instance 1.7 mm. The aluminium material may for instance have a weight of over 1 kg/m², for instance 1.3 kg/m². The apertures in the mesh may have a height of 10 mm and a width of 5 mm.

A roll 2 of the aluminium mesh web S of FIG. 3 thus obtained is unwound in the direction A, and runs in the direction B to diverting roller 4, and then goes downward in the direction C to a first turning roller 5a, while being immersed in the first bituminous material T. The direction of running of the web S is turned 180 degrees, after which the web S moves upward in direction D, to a first upper turning roller 5*b*. Subsequently the web S goes downward again, upward, and downward once more and then upward again to diverting roller 6. It is remarked that one or more rollers may have been provided depending on the desired coating of the web S.

By setting the height of the lower rollers, temperature influences can be anticipated. Usually, because of the location of the heating 8, the bituminous material at the bottom of the container will have a higher temperature than in the areas situated more upward. This has consequences for the viscosity, and as a result for the adhesion of the bituminous material to the mesh S.

The apertures of the mesh S on arrival at the roller 6 have been filled with bituminous material T. When circulating around roller 6 the in this case upper side of the mesh web S1 is skimmed by a first scraper 9, almost down to the mesh material. Scraped off bituminous material is collected in the container 7.

After passing the roller 6 the second scraper 10 also scrapes off the lower side of the web S1 almost down to the mesh.

After passing the second scraper 10 the bituminous material will still tend to sag from the web S. Said sagging is counteracted by supply of a foil X, for instance PE-foil, coming from the roll 11 that is unwound in the direction F about shaft 12. The foil X connects such to the container 7, that no bituminous material ends up next to the container. The foil web X is guided around roller 13 against the bottom side of the web S1 provided with bituminous material. The web S2 thus obtained, with the still hot (for instance 80° C.) bituminous material T, moves in the direction E, and arrives on the belt conveyor 14, on the upper course of the belt 17. At the upper side of the web S2 a liquidised second bituminous material U is applied from the storage 19 in the direction H, and is skimmed by skimmer 20 at the desired height with respect to the web S2.

The web S2 has a large degree of flatness, which is achieved by diverting the web S when passing through the bituminous material T. The web S as a result remains flat, because of which also the bituminous material U will adhere more uniformly to the mesh material. Due to the flatness of the web S2 moreover the thickness of the layer of bituminous material U may be more uniform.

The web S3 thus obtained is passed onwards over the belt conveyor 14, wherein the bituminous material is cooled by means of cooling device 18. The web S3 may subsequently be conveyed while foil W is being supplied. The material U then forms the top layer, and may, as described above, be coloured.

However a second top layer of bituminous material V may be applied, which in that case may be coloured material. If the bituminous material V is used, it is supplied in that same manner as bituminous material U, however from storage 20, and skimmed at the desired height by skimmer 22.

In both cases a foil W of UV-resistant material, and or fire-resistant material, may, if necessary, be unwound from roll 22 on shaft 23, applied on the upper side of the web S3 or S4. Finally the composite web S5 is obtained, which is discharged over rollers 24 in order to wound up on roll 25.

At the roll 13, the bituminous material T may have a temperature of approximately 80° C.

On arrival at the cooled belt conveyor 14, the mesh material is as it were wrapped in bituminous material. As a result the heat of the subsequently supplied bituminous material has little effect on the mesh material.

Due to the mesh material being tightly surrounded by the first bituminous material, and the application of a second bituminous material on said first bituminous material, wherein the second bituminous material can become chemically bonded to the first material, and also may be slightly mechanically connected thereto as a result of flowing in recesses in the upper surface of the layer of first bituminous material, the composite web has high integrity, also when bending several times.

Figure 4:
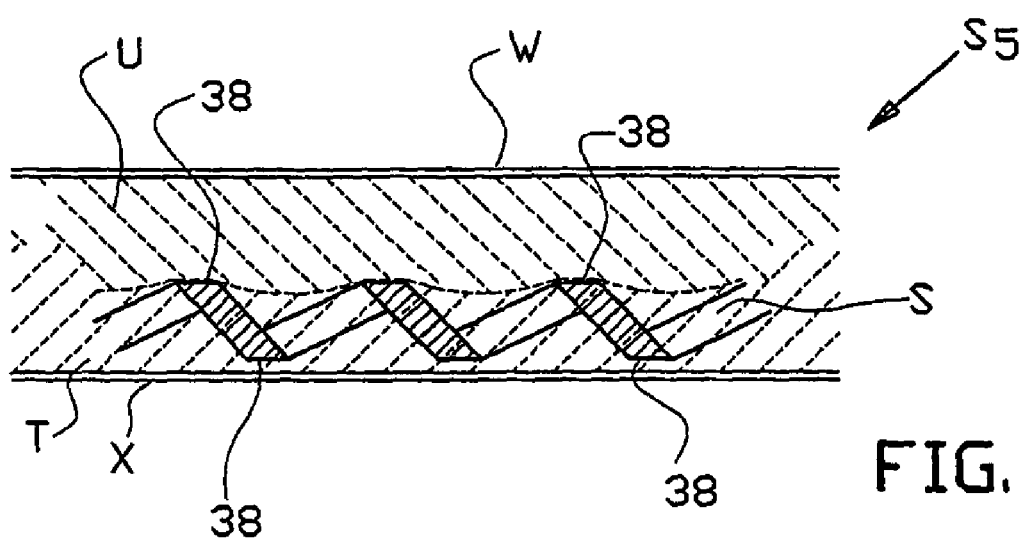
FIG. 4 shows a cross-section of covering material according to the invention.

FIG. 4 shows a cross-section of an embodiment of the coloured composite covering material S4 according to the invention. In this embodiment the metal mesh S is embedded in the bituminous material T in the bottom layer, wherein at the upper side of the layer of first bituminous material T a layer of coloured, second bituminous material U is situated. The thicknesses of the bituminous material U on top of the uppermost planes 38 and below the lowermost planes 38 of the metal mesh S may be 0-1 mm. In addition it is also possible that the uppermost planes 38 reach up into the colour top layer U, or remain below the separation plane between the colour top layer U and covering bottom layer T. This may among others be achieved by adjusting the scraper 9.

The coloured covering material S4 is particularly suitable to be used on roofs, such as on a dormer window, for instance for a watertight connection to an undulating tile roof, adjusted to its colour.

The coloured covering material S4 is rigid, yet plastically deformable, wherein hardly any recoil strength is present. The aluminium stretch metal mesh S, that has been tempered, shows a so-called dead-fold behaviour. The fitter may effortlessly bring the covering material in the desired, fitting connecting shape. The material retains said given shape.

What is claimed is:

1. Method for manufacturing a composite flat covering material, comprising supplying a web of stretch aluminum mesh that has been stretched and tempered, passing the web of stretch aluminium mesh in immersed condition through a bath of first bituminous material, passing the stretch aluminium mesh out of the bath, skimming first bituminous material along at least an upper side of the web of stretch aluminium mesh and applying a layer of second bituminous material onto the skimmed side.

2. Method according to claim 1, wherein the first bituminous material differs from the second bituminous material.

3. Method according to claim 1, wherein the first bituminous material is similar in composition to the second bituminous material.

4. Method according to claim 1, wherein the web of stretch aluminium mesh in the bath is guided around at least one, turning roller and is diverted there from a downward direction of running to an upward direction of running.

5. Method according to claim 4, wherein the web of stretch aluminium mesh is guided around a first plurality of turning rollers disposed in the bath and a second plurality of turning rollers disposed in between the first plurality of rollers to form a zigzag path for the web of stretch aluminum mesh.

6. Method according to claim 5, wherein the second plurality of turning rollers that are disposed in between the first plurality of rollers are disposed over the bath.

7. Method according to claim 1, wherein the web of stretch aluminum mesh when coming out of the bath is guided over a first turning roller, and between a second turning roller and a first scraper disposed above it.

8. Method according to claim 1, wherein the web of stretch aluminium mesh after coming out of the bath is scraped at a bottom side of the web of stretch aluminium mesh that is opposite the upper side.

9. Method according to claim 1, wherein after coming out of the bath and prior to applying the layer of second bituminous material, a foil layer is guided to a bottom side of the web of stretch aluminium mesh that is opposite the upper side.

10. Method according to claim 1, wherein the web is passed to a belt conveyor for supporting the web when applying the layer of second bituminous material.

11. Method according to claim 10, wherein the second bituminous material is applied in liquid condition and is skimmed at a desired thickness.

12. Method according to claim 10, wherein the surface of the belt conveyor is cooled.

13. Method according to claim 1, wherein downstream of applying the layer of second bituminous material a layer of third bituminous material is applied thereon in liquid condition and optionally skimmed at a desired thickness.

14. Method according to claim 13, wherein the second bituminous material differs from the third bituminous material.

15. Method according to claim 13, wherein the second bituminous material is similar in composition to the third bituminous material.

16. Method according to claim 1, wherein the first bituminous material has a temperature in the bath of 140-180° C.

17. Method according to claim 1, wherein the first bituminous material when arriving at the place of application for the second bituminous material has a temperature of below 100° C.

18. Method according to claim 1, wherein the web of stretch aluminium mesh is immersed several times in the bath prior to the layer of second bituminous material being applied.

19. Method according to claim 1, wherein the bituminous material applied at the upper side contains a colourant.

20. Method according to claim 1, wherein the web of stretch aluminium mesh is supplied on a roll and is unwound for supply to the bath.

21. Method according to claim 1, wherein the first and the second bituminous material contain polymer-modified bitumen.

22. Method according to claim 21, wherein the first and the second bituminous material contain APAO-modified bitumen.

23. Method according to claim 1, wherein the method comprises stretching and tempering a web of aluminium mesh to provide the web of stretch aluminium mesh that is supplied in the supplying step.

24. Method according to claim 23, wherein the method comprises flattening the web of aluminium mesh prior to the supplying step.

25. Composite roofing material for roofs, comprising:
a bottom layer comprising a metal layer that is mesh-shaped and provided with apertures, and a layer of bituminous material which has been applied on at least one side of the mesh and extends through the apertures, wherein the bituminous material comprises bitumen and a polymer, and
a colour top layer which has been applied on the bottom layer at its upper side, and comprising a coloured material comprising clear bitumen, a colourant and a polymer,
wherein the clear bitumen of the coloured material in the colour top layer is bitumen from which asphaltenes have been removed.

26. Roofing material according to claim 25, wherein the polymer of the coloured material in the colour top layer is the same as the polymer of the bituminous material in the bottom layer.

27. Roofing material according to claim 25, wherein the polymer is a thermoplastic elastomer.

28. Roofing material according to claim 25, wherein the polymer is an APAO.

29. Roofing material according to claim 25, wherein in the bottom layer, colour top layer, or both, the content of polymer is approximately 10-30% by weight, based on the overall weight of the layer in question.

30. Roofing material according to claim 29, wherein the content of thermoplastic elastomer is 15-25% by weight.

31. Roofing material according to claim 25, wherein the content of polymer in the bottom layer almost equals the content of polymer in the colour top layer.

32. Roofing material according to claim 25, wherein the colourant of the coloured material in the colour top layer is a pigment.

33. Roofing material according to claim 32, wherein the pigment is selected from the group consisting of red and yellow iron oxides, titan oxides (white), chrome green and cobalt blue.

* * * * *